(12) United States Patent
Hartmann et al.

(10) Patent No.: US 8,843,232 B2
(45) Date of Patent: Sep. 23, 2014

(54) CONTROL METHOD FOR A COMPLEX CONSISTING OF A PLURALITY OF MULTIAXIAL HANDLING DEVICES ARRANGED IN SUCCESSION AND/OR SIDE BY SIDE, AND ALSO DATA STORAGE MEDIUM, CONTROL SYSTEM AND COMPLEX

(75) Inventors: Guido Hartmann, Leverkusen (DE); Tino Heber, Freiberg (DE); Andre Heydenreich, Zwickau (DE); Holger Hüfner, Bautzen (DE); Raimund Kram, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1356 days.

(21) Appl. No.: 12/512,383

(22) Filed: Jul. 30, 2009

(65) Prior Publication Data

US 2010/0030375 A1   Feb. 4, 2010

(30) Foreign Application Priority Data

Jul. 31, 2008 (EP) .................... 08013765

(51) Int. Cl.
*G06F 7/00* (2006.01)
*G05B 19/418* (2006.01)

(52) U.S. Cl.
CPC .. *G05B 19/4182* (2013.01); *G05B 2219/39102* (2013.01); *G05B 2219/45054* (2013.01); *G05B 2219/50216* (2013.01); *G05B 2219/34246* (2013.01)
USPC .......................................... 700/230; 700/28

(58) Field of Classification Search
USPC .................. 700/230, 28, 29, 30, 31
See application file for complete search history.

(56) References Cited

U.S. PATENT DOCUMENTS

| | | | | |
|---|---|---|---|---|
| 5,105,069 | A * | 4/1992 | Hakenewerth et al. | 235/379 |
| 5,274,956 | A * | 1/1994 | Figge et al. | 451/142 |
| 6,577,923 | B1 * | 6/2003 | White et al. | 700/245 |
| 8,014,899 | B2 * | 9/2011 | Ban et al. | 700/248 |
| 2003/0084974 | A1 * | 5/2003 | Benedetti | 148/663 |
| 2008/0091301 | A1 * | 4/2008 | Brantmark et al. | 700/245 |
| 2009/0228140 | A1 * | 9/2009 | Honegger et al. | 700/230 |

FOREIGN PATENT DOCUMENTS

| | | |
|---|---|---|
| DE | 101 62 967 A1 | 7/2002 |
| DE | 10 2005 048 472 A1 | 4/2007 |
| EP | 1 182 529 A2 | 2/2002 |
| JP | H09-131683 | 5/1997 |
| JP | 2000-187832 | 7/2000 |
| JP | 2007 015055 A | 1/2007 |
| JP | 2007 030087 A | 2/2007 |
| JP | 2008 021092 A | 1/2008 |
| WO | WO 0020167 | 4/2000 |
| WO | WO 02/082192 A2 | 10/2002 |

* cited by examiner

Primary Examiner — Ramya Burgess
(74) Attorney, Agent, or Firm — Henry M. Feiereisen LLC

(57) ABSTRACT

A control method for a complex consisting of a plurality of multiaxial handling devices arranged in succession and/or side by side, is provided. A complex consisting of a plurality of multiaxial handling devices, arranged in succession and/or side by side, for the execution of multidimensional working and/or handling movements and consisting of at least one conveyor facility for transporting objects is controlled. The handling devices are provided for picking up, processing and setting down the objects being transported along. The guide value for the multidimensional movement sequence of handling devices is modeled on one or more objects transported along by a conveyor facility as a guide value in a distributed multiaxial system with synchronous operation, such as for example in the case of a printing machine, a paper mill or rolling mill or the like.

17 Claims, 5 Drawing Sheets

CONTROL METHOD FOR A COMPLEX CONSISTING OF A PLURALITY OF MULTIAXIAL HANDLING DEVICES ARRANGED IN SUCCESSION AND/OR SIDE BY SIDE, AND ALSO DATA STORAGE MEDIUM, CONTROL SYSTEM AND COMPLEX

CROSS REFERENCE TO RELATED APPLICATIONS

This application claims priority of European Patent Office Application No. 08013765.6 EP filed Jul. 31, 2008, which is incorporated by reference herein in its entirety.

FIELD OF INVENTION

The invention relates to a control method for a complex consisting of a plurality of multiaxial handling devices arranged in succession and/or side by side for the execution of multidimensional working and/or handling movements for the given situation and consisting of at least one conveyor facility for transporting objects along the handling devices. The handling devices are provided for picking up, processing and setting down the respective objects being transported along.

Furthermore, the invention relates to a data storage medium having a model, stored in machine readable form, consisting of technology objects for modeling the functionality of a complex consisting of a plurality of multiaxial handling devices and conveyor facilities.

In addition, the invention relates to a control system for a complex of this type and also a complex having a control system of this type.

BACKGROUND OF INVENTION

With regard to the aforementioned handling devices, these are particularly robots, that is to say universally deployable automatic handling devices having a plurality of axes. The movements of the machine axes are freely programmable and where applicable are sensor guided. The movement is controlled by means of a guide value transferred to the respective handling device or to a drive control unit for the handling device. With regard to the axes, these can be translatory and/or rotatory axes.

The handling devices considered can be equipped with pickup heads for picking up and setting down objects or for picking up tools, processing tools or other production equipment. Such types of handling devices can perform manipulation, production, processing or automation functions. Depending on the design of the handling device, movements may be executed in one surface, such as for example in a cylindrical surface, or within a three-dimensional working space. Further known handling devices are so-called pickers, such as for example delta pickers or roller pickers operating in two- or three-dimensional fashion, or horizontal articulated-arm robots referred to as SCARA robots. The pickers are preferably used for packing objects requiring packaging, such as for example chocolates, pastries, writing materials, medical products and the like. Generally speaking, the objects in question can be finished goods, semi-finished products, individually packaged goods, assemblies or other intermediate products occurring during the course of manufacture of products.

With regard to the conveyor facilities, these are for example driven belt conveyors, roller conveyors, rotary plates and the like. Such types of conveyor facilities are also referred to as conveyors. They are typically driven at a constant speed, such as for example by means of a standard dimensioned motor. Typically, the objects are moved along a conveyor line. The conveyor facilities can furthermore be equipped with position encoders, such as for example with a rotary encoder. The respective travel position and/or speed of a moved object can then be derived on the basis of the encoder signals acquired. The determination of the respective travel position or of the respective speed of a moved object can for example take place by means of a control unit which is connected in terms of signaling or data to such a position encoder. Alternatively, the respective travel position and/or speed of the objects can be acquired by way of an optical measuring system connected to the control unit. This also includes light barriers for acquiring the exact passage of an object carried along on the conveyor facility.

One or more handling devices frequently operate in a complex with one or more conveyor facilities. The handling devices can be arranged in such a manner with respect to the conveyor facilities that a respective handling device is able to pick only objects from one assigned conveyor facility or a plurality of objects from a plurality of conveyor facilities. A shared control system may be present for controlling the handling devices. Such a control system can have a plurality of control units arranged in distributed fashion and connected by way of a communication system. By preference, such a control unit is a machine controller having a so-called "motion control" functionality. Such a control unit transfers corresponding positioning coordinates as a guide value for the movement of the machine axes to the relevant handling device, in other words to the associated drive for the electrical activation of corresponding actuators of the handling device, such as motors for example. The activation can alternatively or additionally take place in a pneumatic or hydraulic fashion.

With regard to complexes known today comprising handling devices and conveyor facilities, the encoder signals from a respective conveyor facility are read in directly by the control unit which requires them in order to activate a handling device connected thereto. A multiple linkage of the encoder signals to a plurality of control units may possibly also be required.

SUMMARY OF INVENTION

On the basis of the prior art described in the introduction, one object of the present invention is to specify a more flexible and at the same time more reliable control method for a complex of such a type.

A further object of the invention is to specify a suitable data storage medium and also a suitable control system.

Finally, an object of the invention is to specify a complex consisting of a plurality of handling devices and of one control system of such a type.

The object of the invention is achieved by a method, a computer readable medium and a control system as claimed in the independent claims. Advantageous embodiments are specified in the dependent claims.

A guide value for the movement sequence of a multidimensional working and/or handling movement for a respective handling device is modeled as a guide value for multiaxial applications with synchronous operation, such as for example in the case of a printing machine, a paper mill or rolling mill or the like.

The core of the present invention is the fact that an already known modeling of distributed synchronous operation with a plurality of axes can be applied on different or distributed control systems at one or more guide values, to the synchronization of the multidimensional movements of handling devices, which are executed on different or distributed control systems, with the movement of one or more conveyor facilities.

As a result, the guide value for the movement sequence functionality of the individual handling devices can be used as often as required, both in the case of a local application and also in a distributed control system. A multiple read-in of a conveyor actual value is no longer necessary. Moreover, additional cabling for the corresponding encoder is no longer required.

According to one advantageous method variant, a guide value is a position encoder actual value for the respective conveyor facility, an actual or nominal value for a real axis or an actual or nominal value for a virtual, calculated axis.

The particular advantage here is the fact that by way of the interposition of virtual axes the adequately known mechanisms for distributable synchronous operation can be used in the case of multiaxial applications. By this means, the functional scope, such as is available for example in the case of control units of the SIMOTION type from the company Siemens for multiaxial applications, is substantially expanded. A further advantage is the fact that it is possible to switch over between different guide values, such as for example in the event of failure of an encoder.

According to a further advantageous method variant, in order to acquire a guide value, based on a position encoder signal from a position encoder, for the respective conveyor facility an encoder object is provided in the form of a technology object, which models the corresponding technological function.

Technology objects of such a type offer a user a technological view of actuators and sensors, and make available technological functions for these. With regard to the technology objects, these are essentially software modules which are executed in real time on a processor unit of the control system, such as for example on a drive controller of the SIMOTION type from the company Siemens. These can be parameterized for the automation task in hand by way of a respective input interface and output interface.

If such a type of encoder object has been properly parameterized and connected, then the output-side guide value can be associated with any desired handling device in order to perform a corresponding automation task.

It is particularly advantageous if for the purpose of the movement sequence of the multiaxial handling devices with respect to the conveyor facilities path objects in the form of technology objects are used which provide the corresponding functionality for the path interpolation with a simultaneous movement sequence at one guide value. As a result of the capability to predefine or program sequential path movements and the capability to switch the guide value and thus also of the possible capability to assign the path movement to a different conveyor facility for the given situation, a flexible movement sequence is given for the handling devices on the respective selected conveyor facility. The movements of the individual handling devices at the objects transported along by the conveyor facilities can thus also complement or replace one another, and this also applies when control of the handling devices is implemented on different control units.

A handling device which performs an automation task on a conveyor facility can thus advantageously take over the automation task of a failed handling device on an adjacent conveyor facility. As a result, the flexibility in the complex and the availability of such a type of complex are significantly increased.

By preference, the path objects and the at least one encoder object are executed on an identical control system.

If the control system has a plurality of control units arranged in distributed fashion, then the path objects and the at least one encoder object can be executed on different control units. The guide value provided by the respective encoder object is transferred by way of an isochronous communication system, such as for example by way of a bus system, to the control units arranged in distributed fashion. The system-dependent communication delay times occurring during the transfer can be compensated for in the case of the respective guide value by way of an extrapolation of values.

According to a further method variant, an end-point coordinate system, which is related to a base coordinate system by way of a coordinate transformation, is assigned to the respective handling devices in the kinematic end point. In this situation, this end-point coordinate system is part of the respective path object.

Furthermore, an object coordinate system, which is related to a base coordinate system and which is transported along by a respective moving conveyor facility, can be assigned to the respective objects transported along on a conveyor facility. A handling device can then move in synchronous motion with the respective conveyor facility and consequently with the object in question and execute a movement superimposed relative to it for the intended automation task.

According to a further method variant a respective encoder object belonging to a conveyor facility, a technology object belonging to a real axis or to a virtual axis can be individually connected to a respective path object for an assignment of a guide value. It is also possible for one and the same encoder object or one and the same real or virtual axis to be connected to a plurality of path objects which preferably model the corresponding functionality for the path interpolation on an identical conveyor facility.

The interconnection of a respective path object to a respective encoder object belonging to a conveyor facility, a technology object belonging to a real axis or to a virtual axis, can be fixed during operation. Alternatively, the interconnection can be modifiable or switchable during operation, in other words online.

Furthermore, the object of the invention is achieved by a data storage medium which has a model stored in machine readable form consisting of technology objects for modeling the functionality of a complex consisting of a plurality of multiaxial handling devices and at least one conveyor facility for executing the control method according to the invention on a processor-aided control system in real time. To this end, the control system preferably has a real-time operating system. The model consisting of technology objects is typically a software module which is loaded into a working memory of the control system for execution. Possible storage media for consideration include in particular optical storage media, such as for example a CD-ROM or DVD-ROM, magnetic storage media, such as for example a floppy disk or hard disk, and read-only memories in particular, such as for example a USB stick or a flash memory card. Examples of the latter include SD, CF or MM memory cards.

The object is achieved for the control system which has processor-aided means for executing a model stored in machine readable form consisting of technology objects for modeling the functionality of the complex in order to perform the control method according to the invention.

According to one embodiment, the control system according to the invention comprises a plurality of control units, assigned in each case to one of the handling devices and connected by way of a communication system. Furthermore, the control system has compensation means in order to compensate for communication delay times by way of an extrapolation of values. The compensation can for example be performed on a control unit which assumes the master function. The other control units, which then assume the slave function, receive appropriately time-compensated or corrected movement values.

Finally, the object of the invention is achieved by a complex consisting of a plurality of multiaxial handling devices, arranged in succession and/or side by side, for performing multidimensional working and/or handling movements for the given situation, of at least one conveyor facility for transporting objects along the handling devices and also of a control system of such a type.

BRIEF DESCRIPTION OF THE DRAWINGS

The invention and also advantageous embodiments of the invention will be described in detail in the following with reference to the following figures. In the drawings.

DETAILED DESCRIPTION OF INVENTION

Figure 1:
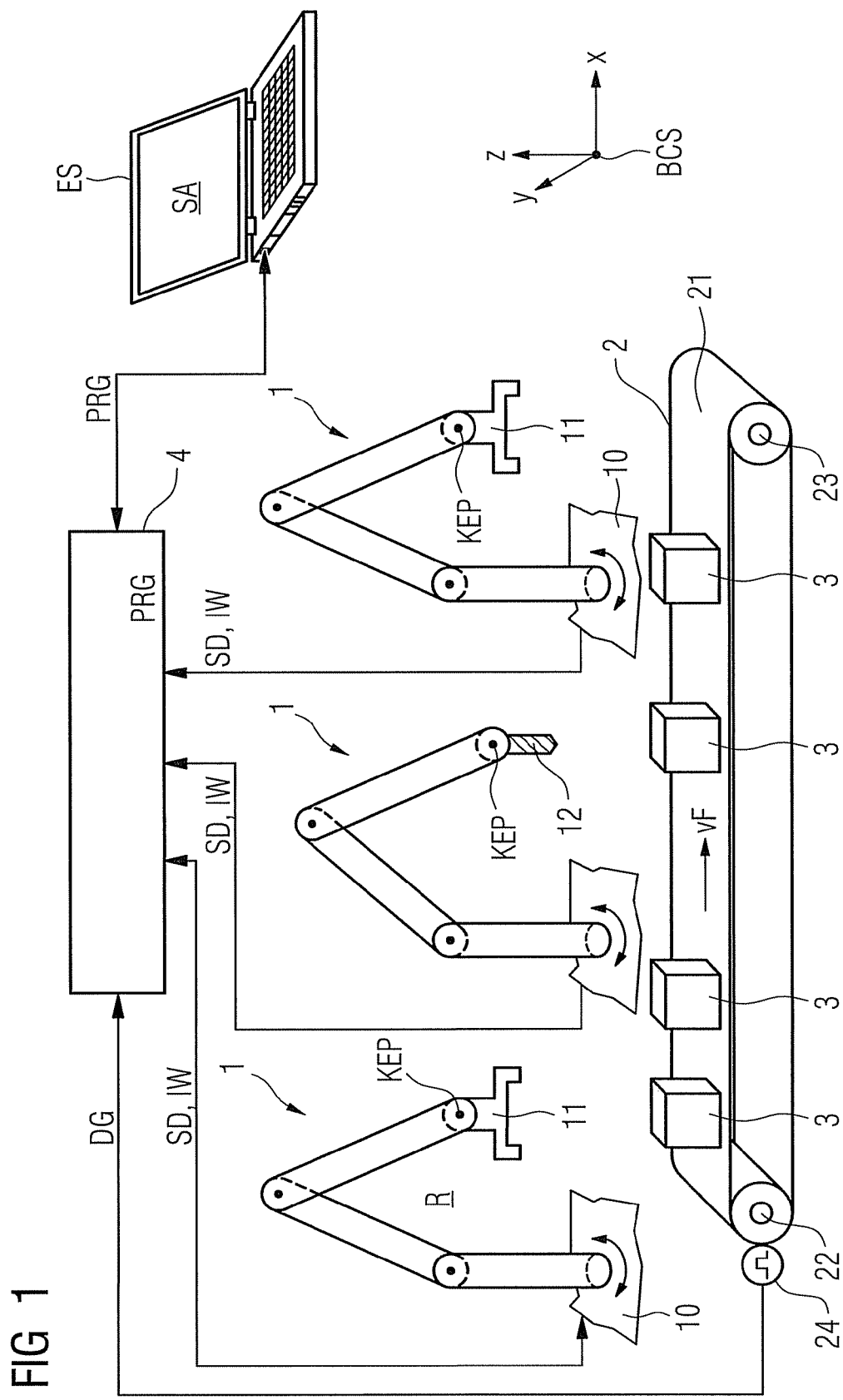
FIG. 1 shows by way of example a complex consisting of three handling devices, a conveyor facility and a superordinate control system according to the prior art.

FIG. 1 shows by way of example a complex consisting of three handling devices 1, a conveyor facility 2 and a superordinate control system 4 according to the prior art.

The handling devices 1 or robots shown in the central part of FIG. 1 have four rotatory axes with rotor arms situated between them. KEP serves to designate a so-called kinematic end point which forms the spatial end point for the path computation. The reference character 10 serves to designate a fixed base of the robot 1 and the reference character 11 serves to designate a pickup head which is arranged so that it can swivel around the KEP and which is designed for picking up and setting down objects 3 and also for picking up a tool 12, such as a drill for example. The arrangement of the axes of the respective handling devices 1 enables a three-dimensional movement of the pickup head 11 in a respective working space R. The objects 3 in question are by way of example cubes which, amongst other things, are provided with drill holes by the central handling device 1.

A conveyor facility 2 in the form of a belt conveyor for transporting the objects 3 to be picked is shown in the lower part of FIG. 1. The belt conveyor 2 has a conveyor belt 21 which is preferably driven at constant speed vF by means of two rollers 22, 23. It is also possible to drive only one of the two rollers 22, 23. A rotary encoder 24 on one of the rollers 22 is used in order to acquire distance pulses DG.

In the upper part of FIG. 1 a control system 4 is shown which has a processor-aided control unit (not described in further detail) for executing an automation program PRG amongst other things. The control system 4 outputs positioning coordinates SD to the respective handling devices 1 for movement control of the axes. In the reverse direction, the control system 4 receives associated, current coordinate actual values IW. In the example shown in FIG. 1, the control system 4 is connected to the rotary encoder 24 for acquiring the distance traveled by the conveyor belt 2. On the basis of the distance pulses DG acquired, the current position of the objects 3 can be ascertained by the control system 4.

Furthermore, the control system 4 shown executes the automation program PRG which is fed to the control system 4, for example, by way of an engineering system ES. SA serves to designate a system architecture, stored on the engineering system ES, on the basis of which the executable automation program PRG is generated. Finally, BCS serves to designate a fixed base coordinate system to which all the multidimensional computations and movements relate.

Figure 2:
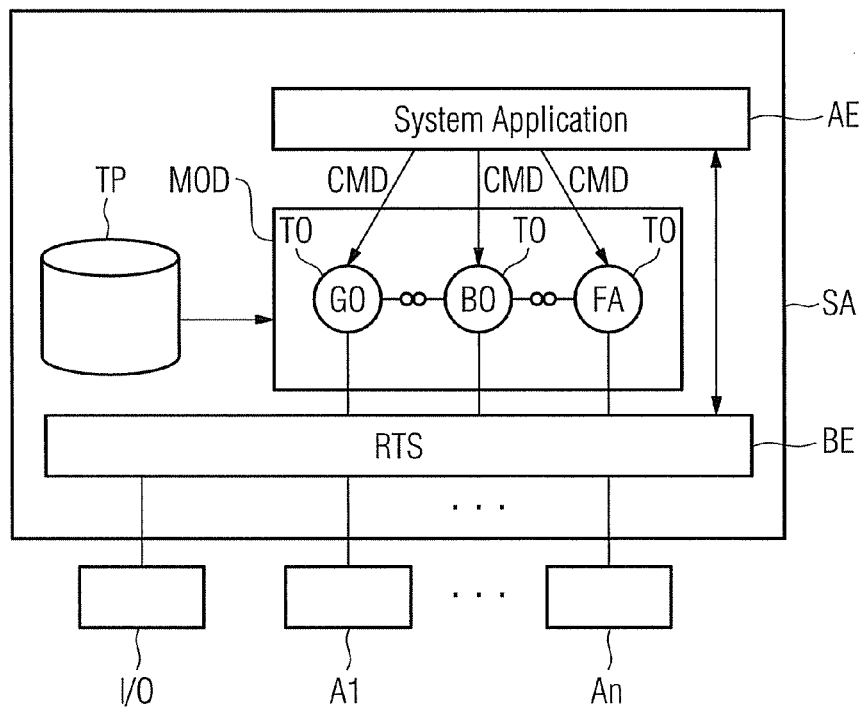
FIG. 2 shows by way of example a system architecture with a model based on technology objects for modeling the functionality of a complex with multiaxial handling devices.

FIG. 2 shows by way of example a system architecture SA with a model MOD based on technology objects TO for modeling the functionality of a complex including multiaxial handling devices 1.

The system architecture SA shown comprises a system application on the application level AE and also a model MOD for modeling the multidimensional movement sequence particularly on the basis of path objects BO and encoder objects GO as technology objects TO. The linkages between the technology objects TO, GO, BO, FA are represented by means of coupled "curls". FA serves by way of example to designate the technology object TO "slave axis", which for its part can be the guide value for a further path object BO.

In this situation the respective guide value for the movement sequence of a multidimensional working and/or handling movement for a respective handling device is now modeled as a guide value for multiaxial applications with synchronous operation, such as for example in the case of a printing machine, a paper mill or rolling mill or the like. The respective guide value can be a position encoder actual value for the respective conveyor facility, an actual or nominal value for a real axis or an actual or nominal value for a virtual, calculated axis. In order to acquire a guide value for the respective conveyor facility based on the position encoder signal from a position encoder, an encoder object GO in the form of such a technology object TO is provided in each case which models the corresponding technological function. Furthermore, such path objects BO are provided in the form of technology objects TO for computing the multiaxial movement of a handling device, which model the corresponding functionality for the path interpolation.

RTS serves to designate a real-time operating system on the operating system level BE, which outputs corresponding, time-related control signals to the axes A1 to An to be energized, or to their appropriate drives. I/O serves to designate input and output signals, such as for example for energizing actuators or for acquiring information from sensors, such as for example encoder signals. CMD serves to designate control commands which are transferred by the system application to the model MOD. Such types of commands can for example include a MOVE command for moving an axis a certain distance. TP serves to designate a database or a technology package, in which the functional scope of the respective technology objects TO is defined and the associated source code is also stored. The entire system architecture SA can also be executed as an executable automation program PRG on the assigned control system 4. Changes and revisions are typically made in an engineering system ES on which the system architecture SA is stored.

Figure 3:
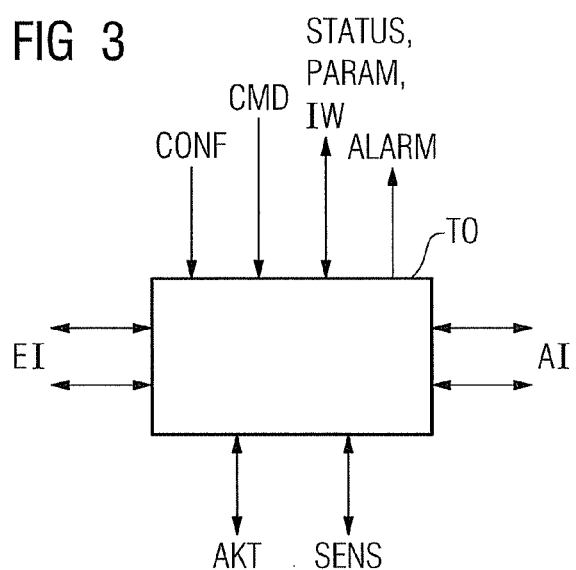
FIG. 3 shows by way of example the input-side and output-side interfaces of a technology object.

FIG. 3 shows by way of example the input-side and output-side interfaces of a technology object TO. EI serves to designate an input-side interface and AI an output-side interface for interconnecting with further technology objects TO or with a guide value. AKT serves to designate signals for energizing actuators and SENS serves to designate input signals for acquiring information from sensors. The technology objects TO can furthermore output alarm messages ALARM in the event of a fault. The software interface CONF enables the technology object TO to be configured. A control command CMD from the superordinate application level AE is fed in by way of a command input. STATUS and PARAM serve to designate status information and parameters which can be output, and IW serves to designate actual values which a technology object TO requires for example in order to perform a regulation function.

Figure 4:
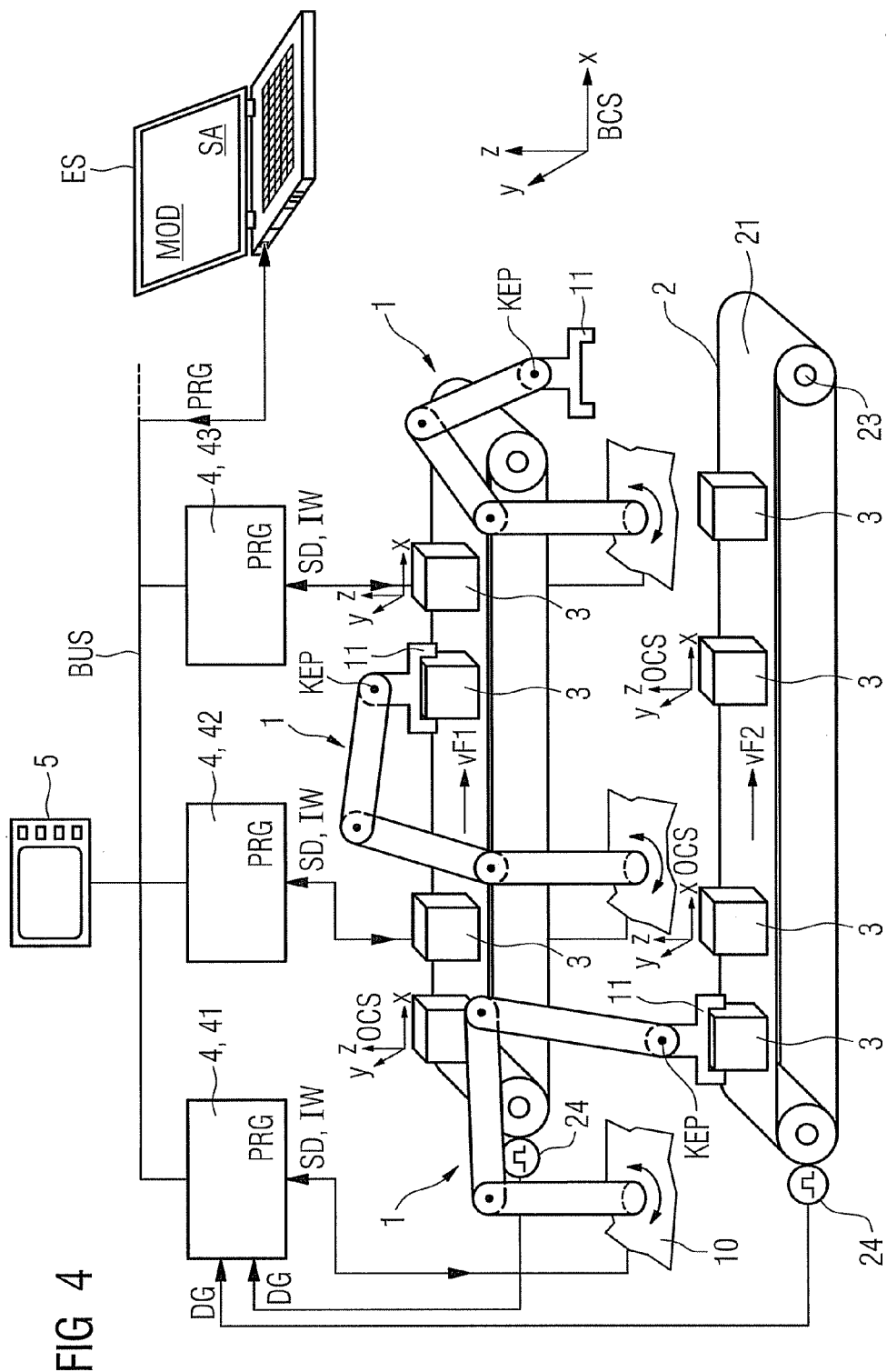
FIG. 4 shows by way of example a complex consisting of three handling devices, two conveyor facilities and a superordinate, distributed control system.

FIG. 4 shows by way of example a complex consisting of three handling devices 1, two conveyor facilities 2 and a superordinate, distributed control system 4.

In contrast to the complex according to FIG. 1, the handling devices 1 are arranged along two conveyor facilities 2 having different conveying speeds vF1, vF2. In this situation they are arranged in such a manner that they can "work" both on the first conveyor facility 2, illustrated in the lower part of FIG. 4, and also on the second conveyor facility 2, illustrated in the central part of FIG. 4.

The control system 4 shown in the upper part of FIG. 4 is designed in order to coordinate the complex consisting of the three multiaxial handling devices 1 arranged in succession by way of example, for the execution of multidimensional working and/or handling movements for the given situation and consisting of the two conveyor facilities 2 for transporting objects 3 along the three handling devices 1.

The control system 4 shown has processor-aided means, such as for example a CPU, for the execution of a model MOD stored in machine readable form in order to perform the control method. In the present example, the model MOD is converted within a system architecture SA on an engineering system ES into an automation program PRG capable of running on the control system 4. If the control system 4, as shown in FIG. 4, comprises a plurality of control units 41-43, in each case assigned to one of the handling devices 1 and connected by way of a communication system BUS, then the automation program PRG can be distributed to the respective control units 41-43. The model MOD and also the automation program PRG can also be stored on a data storage medium and loaded from there into the respective control unit 41-43.

In the case of the distributed control units 41-43, the path objects and the at least one encoder object are executed on the distributed control units 41-43. The guide value provided through the respective encoder object is then transferred by way of an isochronous communication system BUS to the control units 41-43 arranged in distributed fashion. The communication delay times occurring during the transfer with regard to the respective guide value are compensated for in each case by way of an extrapolation of values.

Furthermore, an end-point coordinate system which is related to the base coordinate system BCS shown by way of a coordinate transformation can be assigned to the respective handling devices 1 in the respective kinematic end point KEP. The end-point coordinate system, not itself shown in FIG. 4 for reasons for clarity, is preferably part of the respective path object. This is described in more detail in the example shown in the following FIG. 5.

An object coordinate system OCS, which is likewise related to the base coordinate system BCS and which is transported along with a respective moving conveyor facility 2, can preferably be assigned to the respective objects 3 transported along. To this end, four object coordinate systems OCS are drawn in for the transported objects or cubes 3 by way of example.

If a path object BO for modeling the function of the path interpolation is now assigned in each case to the handling devices 1 shown, then the respective handling device 1 can synchronize itself with the object coordinate system OCS of the respective conveyor facility 2 or with the also moving OCS of the assigned object 3. The assignment to the relevant object coordinate system OCS is effected by way of an input-side interconnection of the respective path object with the corresponding encoder object. The definition of which path object is linked with which handling device 1 can be determined once. The definition of which handling device is linked with which encoder object on the side of the conveyor facility 2 or which real or virtual axis is linked with this path object can be determined once or alternatively can be switched over or changed during operation, such as for example by means of a control and monitoring unit 5 which is likewise connected to the bus system BUS.

Figure 5:
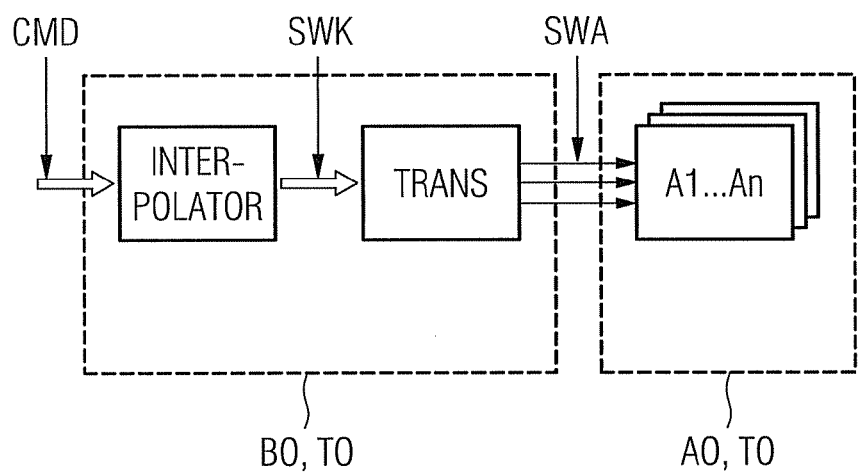
FIG. 5 shows by way of example the functional structure of a path object for modeling the functionality of a multidimensional path interpolation.

FIG. 5 shows by way of example the functional structure of a path object BO for modeling the functionality of a multidimensional path interpolation. Axis objects AO are assigned on the output side to the path object BO shown. These execute the movements predefined in the path object BO for the individual axes. In the path object BO, the computed Cartesian nominal values SWK for the kinematic end point of the respective handling device are converted into axis nominal values SWA for the individual axes of the handling device.

Figure 6:
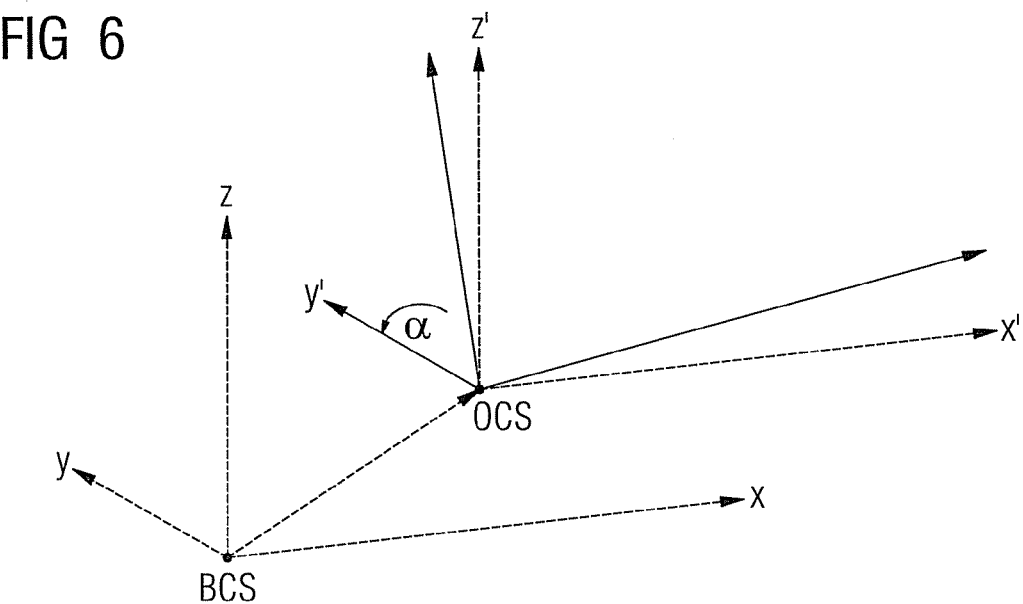
FIG. 6 shows an example of an object coordinate system and its relationship to a base coordinate system.

FIG. 6 shows an example of a object coordinate system OCS and its relation to a base coordinate system BCS. The OCS shown is displaced linearly with respect to the base coordinate system BCS and at the same time rotated by an angle α, x, y, z and x', y', z' serve to designate the associated Cartesian coordinates.

Figure 7:
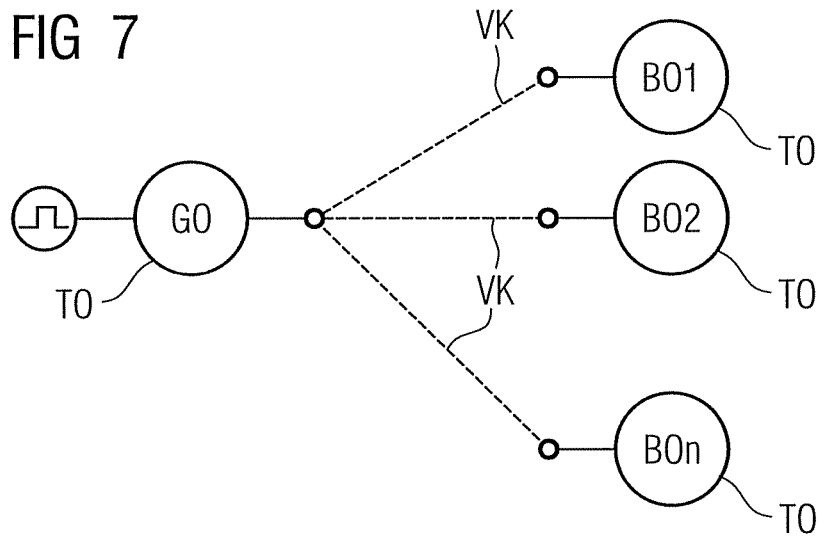
FIG. 7 shows an example of interconnections from an encoder object to a plurality of path objects and FIG. 8 shows an example of interconnections from a plurality of encoder objects, a real axis and a virtual axis to a path object.

FIG. 7 shows an example of interconnections from an encoder object GO to a plurality of path objects BO1-BOn. In principle, any desired number of path objects BO1-BOn can be connected to an encoder object GO. The respective interconnection VK can be fixed or alternatively switchable.

Figure 8:
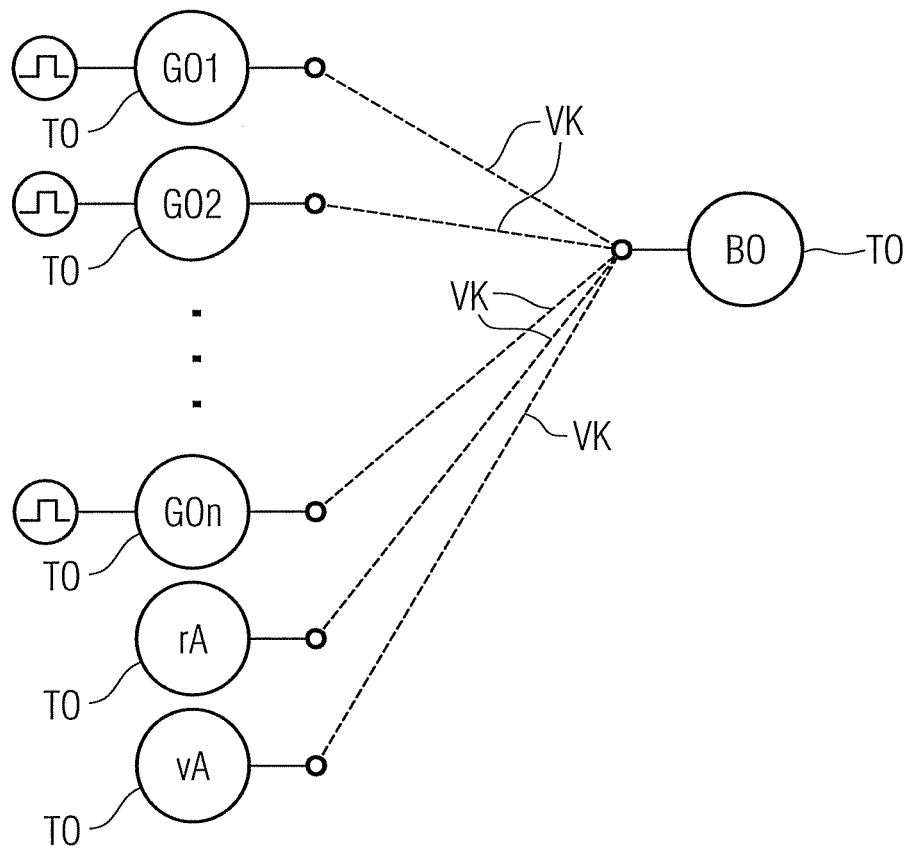

FIG. 8 shows an example of interconnections from a plurality of encoder objects GO1-GOn, a real axis rA and a virtual axis vA to a path object BO. According to the example shown in FIG. 7, in principle, any desired number of encoder objects GO1-GOn and axes rA, vA can be connected to a respective path object BO. The virtual axis vA is preferably a computational axis in order to emulate the behavior and the movement options of a real axis. The respective interconnection VK can here also be fixed or alternatively switchable.

The invention claimed is:
1. A control method for a complex including
a plurality of multiaxial handling devices executing multidimensional working and/or handling movements, and
a conveyor device for transporting objects along the handling devices, the handling devices being provided for picking up, processing and setting down the objects transported along,
the method comprising:
modeling a guide value for a movement sequence of a multidimensional working and/or handling movement for a handling device by path objects in the form of technology objects which provide functionality for path interpolation with a simultaneous movement sequence at a guide value for the respective conveyor device.

2. The control method as claimed in claim 1, wherein the multiaxial handling devices are arranged in succession or side by side.

3. The control method as claimed in claim 1, wherein the multiaxial handling devices are arranged in succession and side by side.

4. The control method as claimed in claim 1, wherein the guide value is
a position encoder actual value for the conveyor device,
an actual or nominal value for a real axis or
an actual or nominal value for a virtual, calculated axis.

5. The control method as claimed in claim 4, wherein, in order to acquire the guide value based on a position encoder actual value for the conveyor device, an encoder object is provided in the form of a technology object, which models a corresponding technological function.

6. The control method as claimed in claim 1, wherein, in order to execute the multiaxial movement sequence of a handling device, path objects are provided in the form of technology objects which model a functionality for the path interpolation.

7. The control method as claimed in claim 5, wherein, in order to execute the multiaxial movement sequence of a handling device, path objects are provided in the form of technology objects which model a functionality for the path interpolation.

8. The control method as claimed in claim 7, wherein the path objects and the encoder object are executed on an identical control system.

9. The control method as claimed in claim 6, wherein an end-point coordinate system, which is related to a base coordinate system by way of a coordinate transformation and which is part of the respective path object, is assigned to the respective handling devices in a kinematic end point.

10. The control method as claimed in claim 1, wherein an object coordinate system, which is related to a base coordinate system and which is transported along by a respective moving conveyor device, is assigned to the respective objects transported along.

11. The control method as claimed in claim 6, wherein an encoder object belonging to a conveyor device, a technology object belonging to a real axis or to a virtual axis, is individually connected to a respective path object for an assignment of a guide value.

12. The control method as claimed in claim 11, wherein an interconnection of a respective path object with a respective encoder object belonging to a conveyor device, a technology object belonging to a real axis or to a virtual axis, is fixed during operation.

13. A non-transitory computer readable medium with a model stored in machine readable form comprising technology objects for modeling a functionality of a complex comprising a plurality of multiaxial handling devices performing multidimensional working and/or handling movements and a conveyor device for transporting objects along the handling devices, wherein the model is provided for executing a control method an a processor-aided control system in real time, the control method comprising:
modeling a guide value for a movement sequence of a multidimensional working and/or handling movement for a handling device by path objects in the form of technology objects which provide functionality for path interpolation with a simultaneous movement sequence at a guide value for the respective conveyor device.

14. A control system, comprising:
a complex comprising a plurality of multiaxial handling devices executing multidimensional working and/or handling movements and comprising a conveyor device for transporting objects along the handling devices, the handling devices being provided for picking up, processing and setting down the objects being transported along;
a processor for executing a model stored in machine readable form
comprising technology objects for modeling a functionality of the complex in order to perform a control method,
the method comprising:
modeling a guide value for a movement sequence of a multidimensional working and/or handling movement for a handling device by path objects in the form of technology objects which provide functionality for path interpolation with a simultaneous movement sequence at a guide value for the respective conveyor device.

15. The control system as claimed in claim 14, wherein the multiaxial handling devices are arranged in succession or side by side.

16. The control system as claimed in claim 14, further comprising:
a non-transitory computer readable medium storing the model in machine readable form.

17. The control system as claimed in claim 14, further comprising:
a plurality of control units, assigned in each case to one of the handling devices and connected by way of a communication system; and
compensation means in order to compensate for communication delay times by way of an extrapolation of values.

* * * * *